US008327948B2

(12) United States Patent
Stark et al.

(10) Patent No.: US 8,327,948 B2
(45) Date of Patent: Dec. 11, 2012

(54) ELECTRICAL HAND TOOL DEVICE

(76) Inventors: Guenther Stark, Frickenhausen (DE); Mathias Naumann, Unterensingen (DE)

( * ) Notice: Subject to any disclaimer, the term of this patent is extended or adjusted under 35 U.S.C. 154(b) by 667 days.

(21) Appl. No.: 12/318,681

(22) Filed: Jan. 6, 2009

(65) Prior Publication Data

US 2009/0126959 A1 May 21, 2009

Related U.S. Application Data

(63) Continuation of application No. 11/711,707, filed on Feb. 28, 2007, now abandoned.

(30) Foreign Application Priority Data

Mar. 18, 2006 (EP) .................................... 06005591

(51) Int. Cl.
*B23Q 5/12* (2006.01)
*B25B 21/00* (2006.01)

(52) U.S. Cl. ........................................................ 173/48

(58) Field of Classification Search ..................... 173/48
See application file for complete search history.

(56) References Cited

U.S. PATENT DOCUMENTS 3,866,692 A * 2/1975 Stelljes ........................... 173/48
6,142,242 A * 11/2000 Okumura et al. ............... 173/48
7,308,948 B2 * 12/2007 Furuta ............................. 173/48
2005/0150669 A1 * 7/2005 Umemura et al. .............. 173/48
2007/0056756 A1 * 3/2007 Chung et al. ..................... 173/48
2007/0175645 A1 * 8/2007 Milbourne et al. ............... 173/1
2007/0181319 A1 * 8/2007 Whitmine et al. .............. 173/48
2007/0201748 A1 * 8/2007 Bixler et al. .................. 382/225

* cited by examiner

*Primary Examiner* — Hemant M Desai
*Assistant Examiner* — Gloria R Weeks
(74) *Attorney, Agent, or Firm* — GrayRobinson, P.A.

(57) ABSTRACT

An electric hand tool device, in particular, a percussion drill or a drill hammer, comprises a spindle (10) that can be driven by a drive motor and cooperates at one end (12) with a tool support, and a percussion element (24) for axially moving the spindle (10) in a percussion position, wherein an adjusting element (42) is provided for adjusting the spindle (10) between the percussion position and a rotary position, the adjusting element (42) comprising a switch ring (44) which is disposed about the spindle (10) and has cam configurations (46,48) on both end faces thereof, wherein one of the cam configurations (46) can engage in a corresponding cam configuration (52) which is fixed to the housing through turning the switch ring (44), and the second cam configuration (48) can be brought into engagement with a corresponding cam configuration (60) of a pressure piece (54) which can be axially moved relative to the housing (16), in order to adjust the percussion element (42) to a percussion position.

4 Claims, 2 Drawing Sheets

ELECTRICAL HAND TOOL DEVICE

This application is a continuation of Ser. No. 11/711,707 filed on Feb. 28, 2007 now abandoned and also claims Paris Convention priority of EP 06 005 591.0 filed Mar. 18, 2006 the complete disclosures of which are hereby incorporated by reference.

BACKGROUND OF THE INVENTION

The invention concerns an electrical hand tool device, in particular, a percussion drill or a drill hammer, comprising a spindle that can be driven by a drive motor and which cooperates at one end thereof with its tool support, and with a percussion means for axially moving the spindle in a percussion position, wherein an adjusting means is provided for adjusting the spindle between the percussion position and a rotary position.

Electric hand tool devices, in particular, percussion drills and drill hammers which have both a percussion position of the spindle, in which the spindle performs an axial translation motion, and a rotary position, wherein the spindle only executes a rotary drive, have an adjusting means between the two positions. In principle, a combined percussion/rotary position may also be provided, in which the spindle is driven both in a rotary and percussive fashion.

A hand drill of this type comprising a means for switching between the operation modes of drilling and percussion drilling is disclosed e.g. in EP 0 755 756 B1, in which the drill spindle is supported against an axial bearing in the rotary drill operating position, wherein the axial bearing is designed as a rolling bearing and the adjusting instrument acts on the drill spindle via this rolling bearing.

A further embodiment of a corresponding drill is disclosed e.g. in EP 0 399 714 B1 which concerns a force-operated drill, comprising a operation mode changing mechanism for changing the mode of operation of the drill between one mode of operation without percussion drilling and one mode of operation with percussive drilling, wherein the mechanism for changing the modes of operation contains a first rigid and a second elastic component.

It is the underlying purpose of the present invention to present an electric hand tool device, whose adjusting means provides a maximum adjusting path in order to also provide a sufficient adjusting path for percussion means with large notch depression.

SUMMARY OF THE INVENTION

The invention solves this object with an electric hand tool device of this type, wherein the adjusting means comprises a switch ring which is disposed about the spindle and has cam configurations on both end faces, wherein, through turning the switch ring, one of the cam configurations can engage into a corresponding cam configuration which is fixed to the housing and a second cam configuration can be brought into engagement with a corresponding cam configuration of a pressure piece which can be axially moved relative to the housing, in order to adjust the percussion means into a percussion position.

The spindle may thereby exercise axial motion due to engagement of the switch ring in the area of its cam configuration with a cam configuration, which is fixed, to the housing. This axial motion is blocked in the non-engaged state due to mutual abutment of the cam configurations. A further axial motion is thereby possible, such that the cam configuration of the pressure piece is immersed into a second cam configuration of the switch ring, thereby doubling the axial stroke of the spindle.

In this fashion, a corresponding adjustment means can be provided with little construction effort even in electric hand tool devices comprising a percussion means, which require a large axial spindle stroke. Turning the switch ring thereby effects the engagement between the cam configuration of the switch ring and the cam configuration of the housing, such that the curves engage each other.

This double engagement between the switch ring and the cam configuration, which is fixed, to the housing, and between the pressure piece and the switch ring provides large axial travel of the spindle, thereby realizing a switching process, with which two cams of a percussion means can come into engagement with each other.

In a particularly advantageous fashion, the pressure piece may thereby cooperate with a spring, which loads the pressure piece away from the switch ring. I.e. the cams of the pressure piece and the switch ring are not engaged in the normal basic position. When e.g. the drill of a corresponding percussion drill is put onto a work piece to be processed, the spindle is axially loaded against the spring force and moves in the axial direction until the cams of the percussion means engage with each other and the cam configurations are immersed into each other between the switch ring and the pressure piece, such that when the electric hand tool device is correspondingly switched, percussive or percussion drilling operation is possible, since the spindle can be moved in an axial direction.

When the spindle is no longer axially loaded, e.g. by removing the electric hand tool device from the work piece, there is no remaining percussive motion of the spindle. In this fashion, an electric hand tool device of this design is much more easy to hold.

The side of the pressure piece opposite the cam configuration may moreover be supported against an axial bearing of the spindle. The axial bearing serves to guide the spindle in the rotary position.

The pressure piece may thereby be preferentially guided in a crank guidance, such that the pressure piece cannot be rotated but perform only a purely translation motion relative to the housing.

A slide switch may moreover be provided as a switch for the adjusting means, which is provided on the outside on a housing of the electric hand tool device. It may perform e.g., in particular, a sliding motion, which rotates the switch ring.

Further advantages and features of the invention can be extracted from the other application documents. The invention is explained in more detail below with reference to the drawing.

DESCRIPTION OF THE PREFERRED EMBODIMENT

Figure 1:
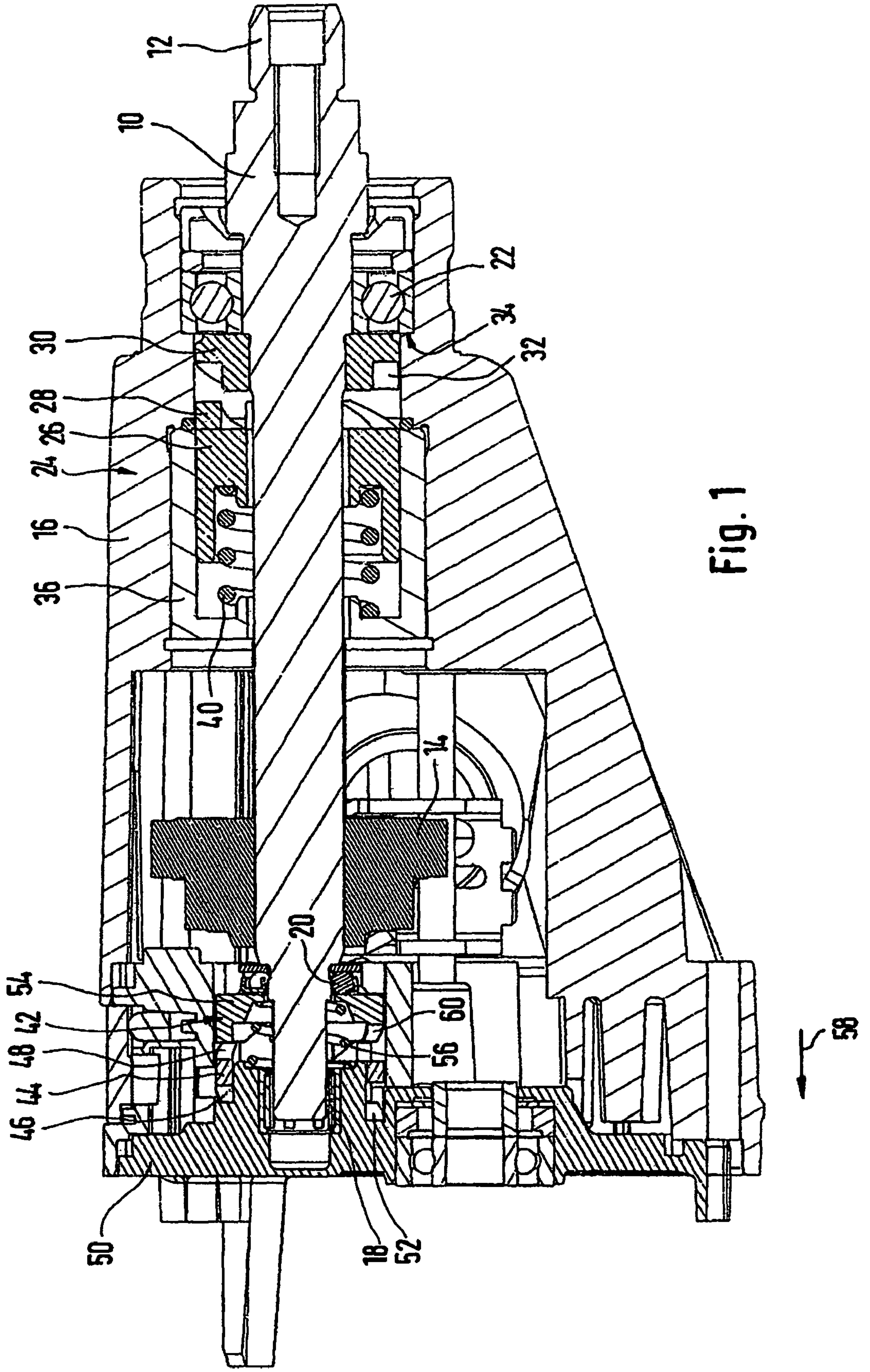
FIG. 1 shows a section of an inventive electric hand tool device in the rotary position.

FIG. 1 shows part of an electric hand tool device comprising a spindle 10 with a support 12 for a tool support, wherein the spindle can be driven via a gear 14 and an electromotor (not shown), which is connected thereto.

The spindle is rotatably disposed in a machine housing 16 via bearings 18, and 22.

The electric hand tool device comprises a percussion mechanism, which is designated in total with reference numeral 24. The percussion mechanism 24 has substantially two elements, i.e. the component 26 with a first cam 28 and a beater 30 with a second cam 32. The two cams 28 and 32 of the components 26 and 30 face each other.

The beater 30 is thereby pressed onto the spindle 10 and axially abuts a stop 34. The beater 30 rotates with the spindle and is axially fixed thereto.

The component 26 can move axially relative to the spindle 10, but cannot rotate relative to the housing 16. The component 26 is guided in a component housing 36, which is inserted and fixed in the machine housing 16.

A spring 40 is also guided in the component housing 36 and is supported on one side against the component 26 and on its other side against the component housing 36, thereby pretensioning it.

FIG. 1 shows an embodiment, in which the cams 28 and 32 are not engaged. In this position, a tool clamped into a work piece support performs a rotary motion only without an axial percussion motion of the spindle 10.

The cams are thereby designed such that at least one of the cams has a control cam, which axially projects towards the other cam past the rest of the cam. Run-up faces are moreover provided, which permit sliding of the two cams on top of each other, thereby permitting over-locking of the control cams provided on one or both cams. So-called depressions are provided between the two control cams.

In the percussion mode (see FIG. 2), the two cams 28 and 32 engage each other in response to pressing a tool onto a work piece to be processed. Rotation of the beater 30 relative to the component 26 moves the two cams relative to each other in a radial direction, such that the control cams cooperate for a certain time and the component 26 is deflected opposite to the direction of the beater 30, thereby loading the spring 40. This loading of the spring 40 stores energy in the spring 40. As soon as a depression has been reached on one or both cams through further rotation of the cams relative to each other, the spring 40 is suddenly relaxed and the component 26 is moved by the released energy towards the beater 30. The component 26 thereby impinges on the beater 30 with a predetermined energy and moves it in an axial direction towards the end 12 of the spindle 10. Since the beater 30 is fixed to the spindle 10, the spindle 10 is moved, together with the beater 30, in an axial direction. This produces a spindle impact, and a percussion drilling operation can be provided to support drilling.

In order to permit switching from a percussion position to a rotary position and vice versa, an adjusting means is provided at the spindle end opposite to the tool support, which is in total designated by reference numeral 42. The adjusting means 42 comprises an adjusting instrument (not shown), in particular, a slide switch that can be displaced and through which an operator introduces and performs the switching process. A switch ring 44, which has cam configurations 46 and 48 on both end faces, is rotated in a transverse sense about the spindle 10 and relative to the housing through actuating the slide switch, wherein the cam configuration 46 can be brought into engagement with a cam configuration on a component 50 which is fixed to the housing, whose cam configuration is designated with 52. In FIG. 1, the cam configurations 46 and 50 are out of engagement.

Figure 2:
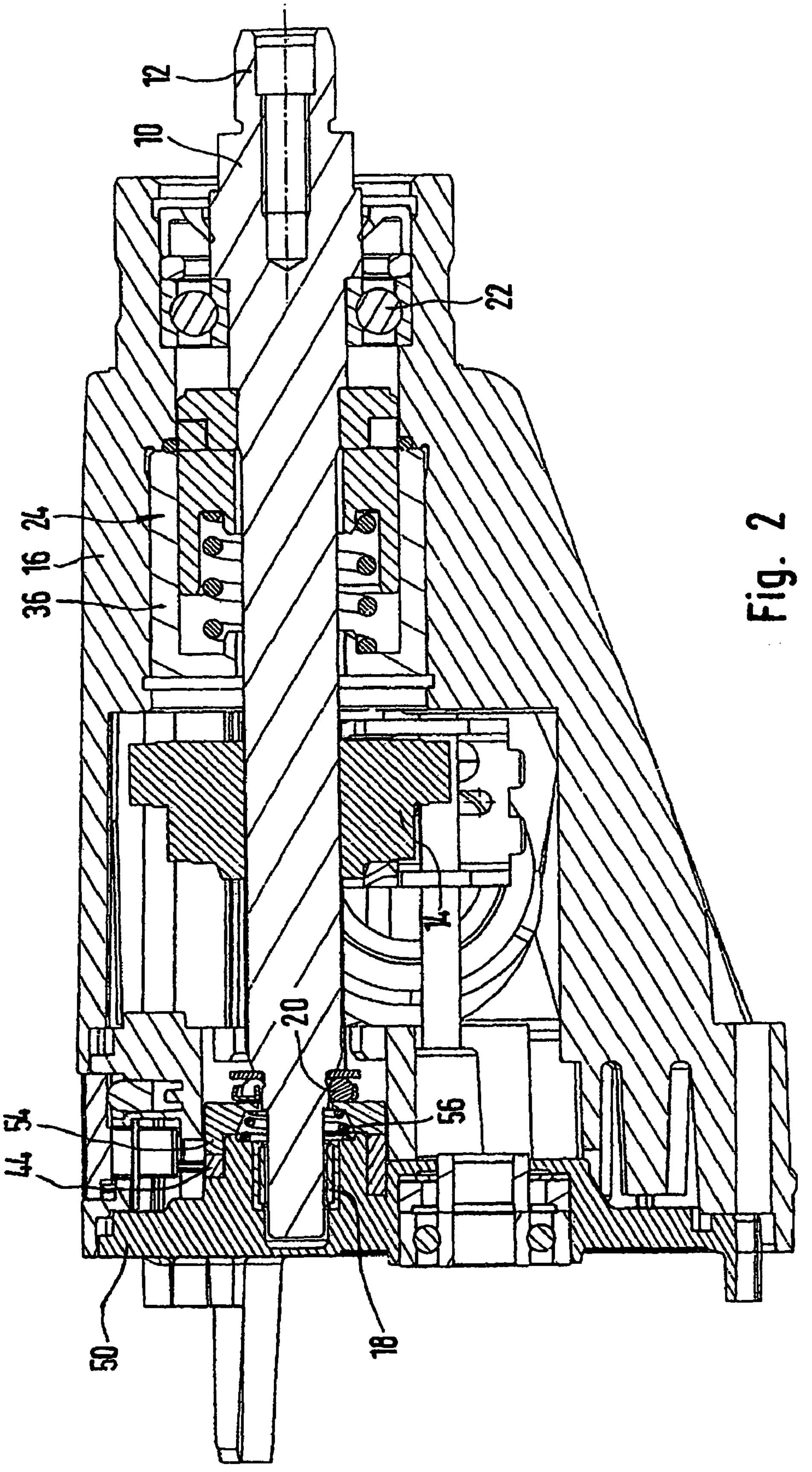
FIG. 2 shows the device in accordance with FIG. 1 in the percussion position.

FIG. 2 shows the cam configurations 46 and 50 of the switch ring, which are in engagement, and of the component 50, which is fixed to the housing. The adjusting means 42 moreover comprises a pressure piece 54, which abuts against the axial bearing 20 via a spring 56, which supports the spindle 10 during rotary operation. The spring 56 presses the pressure piece 54 towards the percussion mechanism 24, such that in the basic position, the percussion mechanism is in a position in which the cams 28 and 32 are out of engagement.

When the adjusting ring is placed into the position shown in FIG. 2 and the spindle 10 end 12 caused to abut a work piece, the spring force of the spring 56 can be overcome, such that the pressure piece 42 is deflected in the direction of arrow 58 to bring a cam configuration 60, which is disposed on the pressure piece on its end facing the switch ring 44, into engagement with the cam configuration 48 of the switch ring 44. This completely engaged configuration is shown in FIG. 2. The spring 56 is thereby maximally compressed. In order to obtain proper engagement and disengagement of the cam configurations 48 and 60, the pressure piece 54 is guided on a crank guidance, such that it can only exercise a translation motion relative to the housing 16. When the user of such an electric hand tool device lifts the device from a work piece to be processed, the pressure on the springs 56 and 40 is consequently reduced, the springs relax, and the percussive motion of the spindle is stopped.

An arrangement as shown in the above figures is advantageous in that the cam configurations 46 and 52 and the cam configurations 48 and 60 engage each other in such a manner as to provide a relatively large stroke for the spindle 10 (clearly visible in FIGS. 1 and 2), wherein the spindle 10 in FIG. 2 is clearly shifted to the left in the plane of the drawing. This large axial motion that the spindle 10 can then perform permits use of a percussion mechanism with high notch depth or high curvature of the cams 28 and 32.

The invention increases the stroke motion without changing the operation of a slide switch.

We claim:

1. An electric hand tool device, a percussion drill, or a drill hammer, the device comprising:

an elongated housing having a front region and a rear region;

a spindle disposed within said housing and extending in an axial direction through said housing from said rear region to said front region, said spindle having a front end for engagement with a tool support at said front region of said housing;

a drive motor disposed in said housing and cooperating with said spindle for drilling rotation of said spindle about an axial spindle axis;

percussion means cooperating with said spindle for axially displacing said spindle in a percussion mode, said percussion means comprising a percussion component having a first cam surface facing said front region of said housing and a beater axially fixed to and rotating along with said spindle, said beater having a second cam surface cooperating with said first cam surface in a percussion mode;

an adjusting means, said adjusting means comprising a rear cam member, a pressure member, and a switch ring disposed about said spindle between said rear cam member and said pressure member, wherein said rear cam member is fixed to said housing in said rear region thereof, said rear cam member having a third cam surface facing said front region of said housing, said third cam surface having cam structures extending through an angular region about said spindle axis, wherein said pressure member has a fourth cam surface facing said rear region of said housing, said fourth cam surface having cam structures extending through said angular region about said spindle axis, said pressure member having a front surface cooperating directly or indirectly with said spindle for axial displacement thereof said switch ring having a fifth cam surface on a rear end face thereof and a sixth cam on a front end face thereof, wherein, in a percussion mode and in response to pressure exerted on a work piece, said fifth cam surface seats in stationary meshed engagement with said third cam surface and said sixth cam surface seats in stationary meshed engagement with said fourth cam surface as said spindle is urged towards said rear region of said housing thereby permitting said second cam surface of said beater to cooperate with said first cam surface of said percussion component, wherein, in a drilling mode, said switch ring is rotated about said spindle axis and out of meshed engagement with said third and said fourth cam surfaces to urge said pressure member and said spindle towards said front region of said housing, thereby leading to disengagement between said first cam surface of said percussion component and said second cam surface of said beater; and a spring cooperating with said pressure member to urge said pressure member away from said switch ring.

2. The electric hand tool device of claim 1, wherein said spindle has an axial bearing supporting said pressure member at said front side thereof opposite to said second cam.

3. The electric hand tool device of claim 1, wherein said pressure member is guided cam such that it cannot be rotated relative to said housing.

4. The electric hand tool device of claim 1, further comprising a slide switch for rotating said switch ring.

* * * * *

UNITED STATES PATENT AND TRADEMARK OFFICE

CERTIFICATE OF CORRECTION

PATENT NO. : 8,327,948 B2
APPLICATION NO. : 12/318681
DATED : December 11, 2012
INVENTOR(S) : Guenther Stark and Mathias Naumann It is certified that error appears in the above-identified patent and that said Letters Patent is hereby corrected as shown below:

In the Specification

Column 3, line 2:
delete "bearings 18, and 22" and replace with --bearings 18, 20 and 22.--

Signed and Sealed this
Twenty-third Day of July, 2013

Teresa Stanek Rea
*Acting Director of the United States Patent and Trademark Office*